United States Patent
Kuwata

(10) Patent No.: US 9,456,180 B2
(45) Date of Patent: Sep. 27, 2016

(54) IMAGE PROCESSING APPARATUS, COMMUNICATION SYSTEM, AND COMPUTER PROGRAM

(71) Applicant: Kohji Kuwata, Kanagawa (JP)

(72) Inventor: Kohji Kuwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/585,330

(22) Filed: Dec. 30, 2014

(65) Prior Publication Data

US 2015/0193914 A1    Jul. 9, 2015

(30) Foreign Application Priority Data

Jan. 8, 2014   (JP) ................................ 2014-001995

(51) Int. Cl.
*H04N 7/14*     (2006.01)
*H04N 7/15*     (2006.01)
*G06F 17/30*    (2006.01)

(52) U.S. Cl.
CPC ............ *H04N 7/15* (2013.01); *G06F 17/3028* (2013.01); *H04N 7/147* (2013.01)

(58) Field of Classification Search
CPC . G01S 5/0072; G06F 17/3028; H04L 12/18; H04L 63/102; H04L 63/105; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185

USPC ......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270; 382/275

See application file for complete search history.

(56) References Cited

U.S. PATENT DOCUMENTS

| | | | | |
|---|---|---|---|---|
| 5,691,767 A | * | 11/1997 | Tahara | ...................... G06T 3/40 348/E7.081 |
| 8,625,434 B2 | * | 1/2014 | Morse | ..................... G10L 19/00 348/14.01 |
| 2007/0291051 A1 | * | 12/2007 | Brown | ............... G02B 26/0816 345/647 |
| 2008/0157994 A1 | * | 7/2008 | Morse | ..................... G10L 19/10 340/7.61 |
| 2009/0297059 A1 | * | 12/2009 | Lee | .......................... G06K 9/40 382/275 |
| 2012/0110224 A1 | | 5/2012 | Tanaka et al. | |
| 2013/0162757 A1 | | 6/2013 | Kawamura et al. | |
| 2013/0265383 A1 | * | 10/2013 | Yamashita | ............... H04N 7/15 348/14.08 |

(Continued)

FOREIGN PATENT DOCUMENTS

| | | |
|---|---|---|
| JP | 2012-98883 | 5/2012 |
| JP | 2013-134733 | 7/2013 |

*Primary Examiner* — Khai N Nguyen
(74) *Attorney, Agent, or Firm* — Oblon, McClelland, Maier & Neustadt, L.L.P.

(57) ABSTRACT

An image processing apparatus includes: a writing controlling unit that writes image information of an input image to a memory; a detecting unit that detects one of a plurality of blocks into which the input image is divided, the one being a block for which writing of corresponding image information to the memory is completed; and a correcting unit that performs a process of correcting a distortion occurring in the input image, for each block in order in which the blocks are detected by the detecting unit.

6 Claims, 8 Drawing Sheets

(56) References Cited

U.S. PATENT DOCUMENTS

2014/0132806 A1* 5/2014 Hara .................. H04N 5/217 348/241

2015/0161773 A1* 6/2015 Takahashi ............ H04N 5/2171 382/173

* cited by examiner

INPUT IMAGE

N LINES

OUTPUT IMAGE (a) MEMORY WRITING PROCESS (b) IMAGE CORRECTION PROCESS

N LINES →

IMAGE PROCESSING APPARATUS, COMMUNICATION SYSTEM, AND COMPUTER PROGRAM

CROSS-REFERENCE TO RELATED APPLICATIONS

The present application claims priority to and incorporates by reference the entire contents of Japanese Patent Application No. 2014-001995 filed in Japan on Jan. 8, 2014.

BACKGROUND OF THE INVENTION

1. Field of the Invention

The present invention relates to an image processing apparatus, a communication system, and a computer program.

2. Description of the Related Art

In teleconference systems (also referred to as video conference systems) that are known today, image correction to image data received from the camera device is usually performed for each frame. In other words, the image data received from the camera is buffered in units of one frame in a memory provided to a terminal device, and predetermined image correction such as distortion correction and perspective correction is performed for each image data of one frame, every time the frame buffering of the image data of one frame is completed. Examples of the related art are disclosed in Japanese Patent Application Laid-open No. 2012-098883 and Japanese Patent Application Laid-open No. 2013-134733.

It is preferable for a teleconference system to be capable of reducing delays in image data transmissions, and of transmitting and receiving image data in real-time without any delay.

In the conventional teleconference systems, however, because the image correction is performed in units of one frame, the image correction is kept idle until buffering of the image data from the camera device is completed for one frame. Because it takes time for the image data worth of one frame to be completely buffered, the timing for starting the image correction may become delayed and an extensive transmission delay may occur when the image data is largely distorted.

In view of the above, there is a need to provide an image processing apparatus, a communication system, and a computer program capable of reducing an image data transmission delay.

SUMMARY OF THE INVENTION

It is an object of the present invention to at least partially solve the problems in the conventional technology.

An image processing apparatus includes: a writing controlling unit that writes image information of an input image to a memory; a detecting unit that detects one of a plurality of blocks into which the input image is divided, the one being a block for which writing of corresponding image information to the memory is completed; and a correcting unit that performs a process of correcting a distortion occurring in the input image, for each block in order in which the blocks are detected by the detecting unit.

A communication system includes: a plurality of terminal devices. Each of the terminal devices includes: a writing controlling unit that writes image information of an input image to a memory; a detecting unit that detects one of a plurality of blocks into which the input image is divided, the one being a block for which writing of corresponding image information to the memory is completed; a correcting unit that performs a process of correcting a distortion occurring in the input image, for each block in order in which the blocks are detected by the detecting unit; and a transmitting unit that transmits the image information subjected to the process of correcting over a certain network. The terminal devices exchange the image information over the network.

A computer program product includes a non-transitory computer-readable medium containing an information processing program. The program causes a computer to function as: a writing controlling unit that writes image information of an input image to a memory; a detecting unit that detects one of a plurality of blocks into which the input image is divided, the one being a block for which writing of corresponding image information to the memory is completed; and a correcting unit that performs a process of correcting a distortion occurring in the input image, for each block in order in which the blocks are detected by the detecting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a teleconference system (also referred to as a video conference system) using an image processing apparatus, a communication system, and a computer program will now be explained in detail with reference to the appended drawings.

Overview

The teleconference system according to the embodiment virtually divides an input image corresponding to one frame into a plurality of blocks (assigns a plurality of blocks to an input image), and performs the image correction in units of the block. The order in which these blocks are subjected to the image correction is determined based on how the image is distorted. For each of the blocks, information indicating the number of horizontal scan lines allowing the image correction to be started is stored. At the timing of completion of the writing of the image data corresponding to the number of horizontal scan lines allowing the image correction to be started for a block to be first subjected to the image correction among a plurality of blocks arranged in one horizontal line, the image correction of the block is started. In this manner, a delay in the image data transmission is reduced, and the real-timeness of the exchanged image data is ensured.

Embodiment

Figure 1:
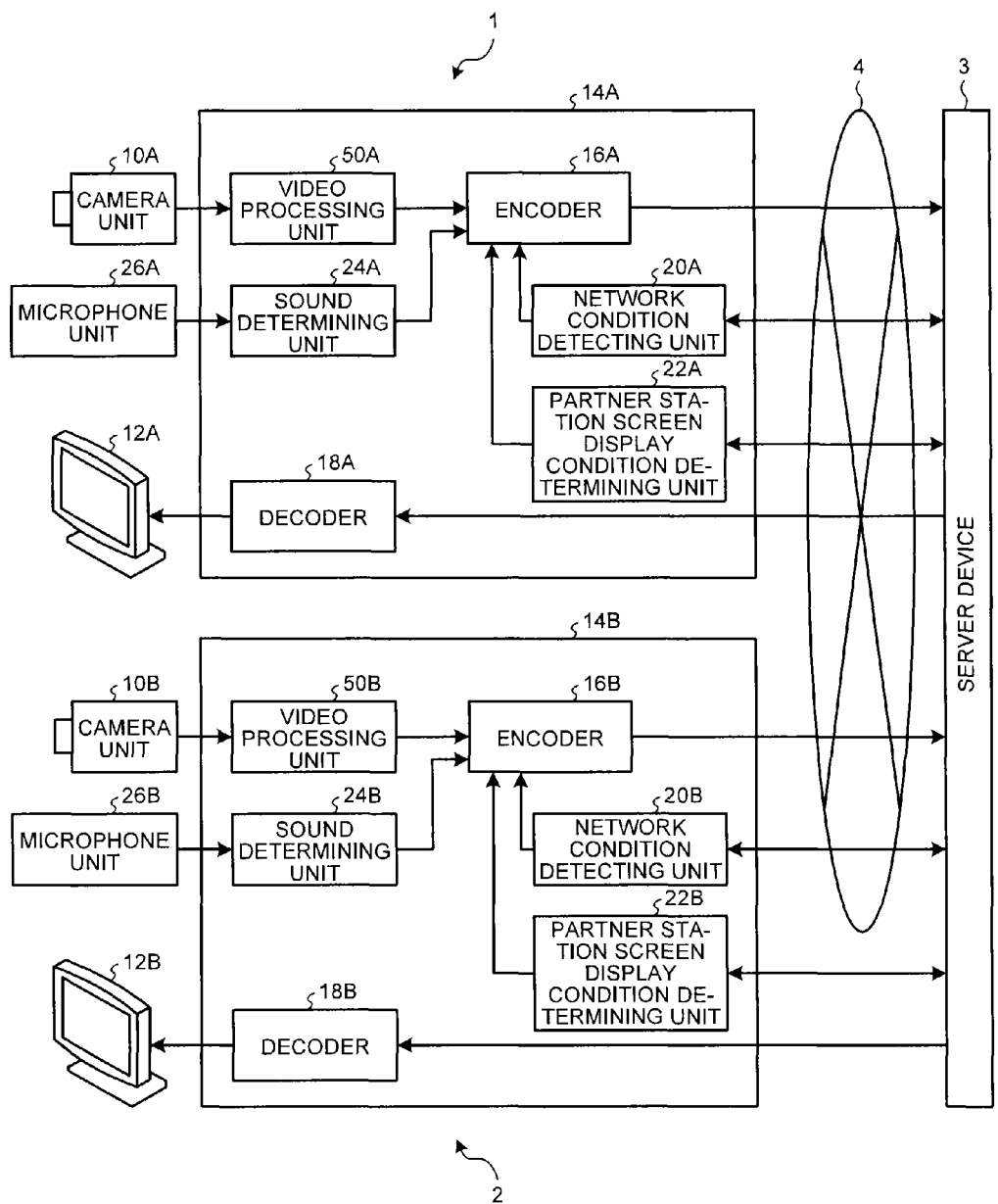
FIG. 1 is a schematic of an overall configuration of a teleconference system according to an embodiment of the present invention.

FIG. 1 illustrates a configuration of the teleconference system according to the embodiment. FIG. 1 illustrates only an image data processing system in the teleconference system. As illustrated in FIG. 1, this teleconference system includes a first location system 1 deployed in a first location, e.g., in Tokyo, and a second location system 2 deployed in a second location, e.g., in Fukuoka, and a server device 3. The server device 3 is deployed in a certain network 4 such as the Internet or an intranet. The server device 3 relays data exchanged between the first location system 1 and the second location system 2 over the network 4.

The first location system 1 includes a camera unit 10A, a display device 12A, a terminal device 14A, and a microphone unit 26A. The camera unit 10A supplies the image data of a captured image of a subject to the terminal device 14A. The display device 12A outputs an image and sound received from the second location system 2. The display device 12A is provided with a speaker for outputting sound received from the second location system 2. The microphone unit 26A collects ambient sound, and supplies the sound data to the terminal device 14A.

The terminal device 14A includes an encoder 16A, a decoder 18A, a network condition detecting unit 20A, a partner station screen display condition determining unit 22A, a sound determining unit 24A, and a video processing unit 50A. The video processing unit 50A performs predetermined image correction such as distortion correction and perspective correction, which are described later in detail, to the image data supplied from the camera unit 10A, and outputs the corrected image data. The sound determining unit 24A supplies sound data of the sound collected by the microphone unit 26A to the encoder 16A. The encoder 16A compression-encodes the image data and the sound data using a video/audio compression encoding technology such as Moving Picture Experts Group (MPEG)-4 or H.264, and transmits the processed image data and sound data to the second location system 2 via the network 4 and the server device 3.

The network condition detecting unit 20A determines condition of the network 4, such as congestion, and notifies the encoder 16A of the condition. The partner station screen display condition determining unit 22A notifies the encoder 16A of the condition of an image displayed on the second location system 2. The encoder 16A performs processing such as changing compression ratio of image data or sound data depending on the notified condition of the network 4, and the notified condition of the displayed image in the second location system 2, for example. The decoder 18A decodes the image data and the sound data received from the second location system 2, and supplies the decoded image data and sound data to the display device 12A. In this manner, the image of a subject captured by the second location system 2 and the sound collected by the second location system 2 are output via the display device 12A.

The second location system 2 has the same configuration as the first location system 1. In other words, the second location system 2 includes a camera unit 10B, a display device 12B, a terminal device 14B, and a microphone unit 26B. The terminal device 14B includes an encoder 16B, a decoder 18B, a network condition detecting unit 20B, a partner station screen display condition determining unit 22B, a sound determining unit 24B, and a video processing unit 50B. The second location system 2 operates in the same manner as the first location system 1. An operation of the teleconference system according to the embodiment will therefore be described below using the configuration of the first location system 1.

Figure 2A:
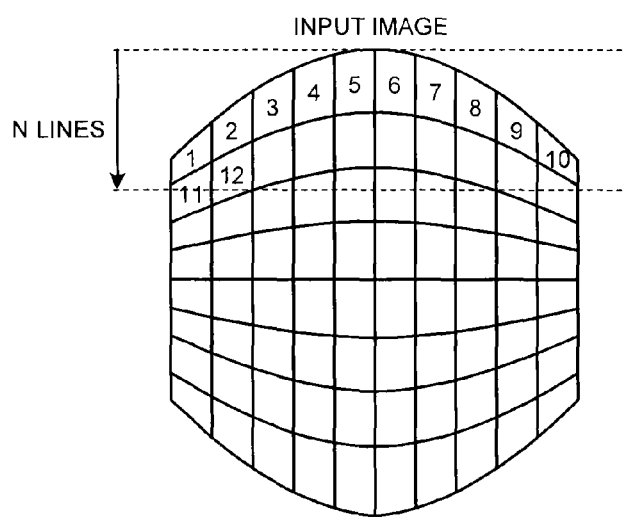
FIGS. 2A and 2B are schematics for explaining a process of image correction according to a comparative example.
Figure 2B:
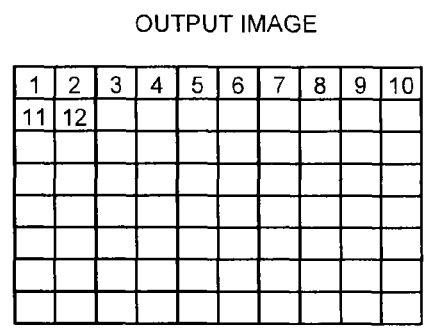

FIGS. 2A and 2B are schematics for explaining image correction according to a comparative example. FIG. 2A illustrates image data (=input image) of a subject captured by the camera unit. When the subject is captured using a wide-angle lens or a fisheye lens, for example, a distortion such as that illustrated in FIG. 2A occurs in the resultant input image. The video processing unit therefore performs image correction such as distortion correction to the input image. FIG. 2B illustrates the image data after the image correction (=output image). In the exemplary image correction illustrated in FIGS. 2A and 2B, the distortion is reduced by reducing the size at the center in FIG. 2A, but the distortion may be reduced by enlarging the size at the periphery, in an opposite manner.

In the image correction according to the comparative example, the image corresponding to one frame is divided into 10×8 blocks, for example, and the image correction is performed to each of the blocks in the ascending order of the block numbers illustrated in FIG. 2A (1→2→3→4→5 . . . ).

In the image correction according to the comparative example, in the ascending order of the block numbers, the image correction is started at the timing at which writing of the entire image data corresponding to all of the blocks in one horizontal line illustrated in FIG. 2A is completed. To explain further, in the example illustrated in FIG. 2A, one block line consists of a plurality of blocks with block numbers 1 to 10 that are arranged in one horizontal scan line. The writing of the image data of the blocks with the block numbers 1 to 10 that makes up one block line is completed at the timing at which the scans of N horizontal lines are completed, as illustrated in FIG. 2A, in the image correction according to the comparative example. "N" herein is a natural number equal to or more than two. "N" is dependent on the distortion factor of the camera lens, and N is larger when the distortion factor of the lens is larger.

Figure 3:
FIG. 3 is a schematic for explaining a delay occurring in the image correction according to the comparative example.
Figure 3:
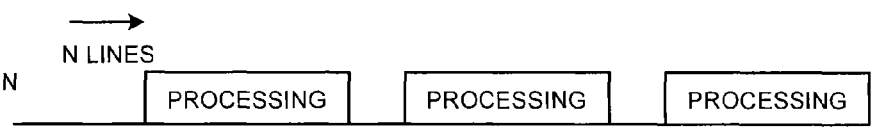

FIG. 3 illustrates the timing at which image data is written to the memory in units of one frame at a part denoted by a symbol (a). FIG. 3 illustrates the timing at which the image correction is performed to the image data written to the memory at a part denoted by a symbol (b). As can be seen from the comparison between the parts denoted by the symbols (a) and (b) in FIG. 3, the image correction is started with a delay corresponding to the time of scanning of the N horizontal lines, from when the writing of the image data to the memory is started.

In the image correction according to the comparative example, therefore, the image correction cannot be started until the scanning of N horizontal lines is completed, so that a transmission delay corresponding to the N lines occurs in the image data transmission. The image data transmission delay becomes extended when the distortion of the image becomes larger.

In the teleconference system according to the embodiment, however, the image correction is performed in order from the block for which writing of the corresponding image data is completed earlier in horizontal scan, depending on a distortion in the image. In this manner, the image correction can be started before the image data corresponding to the entire blocks in one block line is written completely, and therefore, the image data transmission delay can be reduced.

Figure 4:
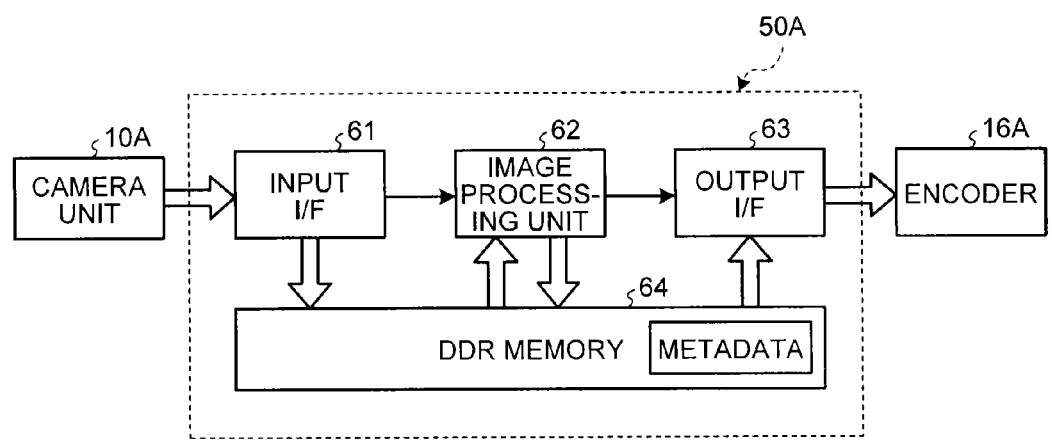
FIG. 4 is a block diagram of a video processing unit included in a terminal device in the teleconference system according to the embodiment.

FIG. 4 is a block diagram of the video processing unit 50A included in the terminal device 14A in the first location system 1. As illustrated in FIG. 4, the video processing unit 50A include an input interface (I/F) 61, an image processing unit 62, an output I/F 63, and a double data rate (DDR) memory 64. The input I/F 61 to the output I/F 63 may be implemented as hardware, or may be partly or entirely implemented as software.

Figure 5:
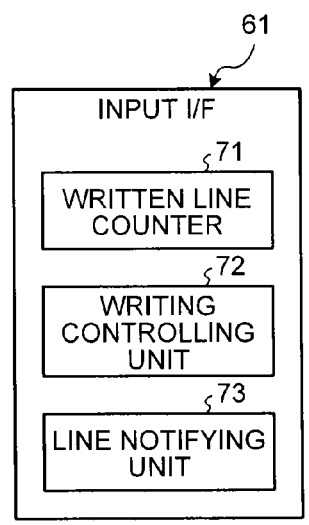
FIG. 5 is a functional block diagram of an input I/F included in the video processing unit.

FIG. 5 is a functional block diagram of the input I/F 61. The input I/F 61 includes, as illustrated in FIG. 5, a written line counter 71, a writing controlling unit 72, and a line notifying unit 73. The written line counter 71 counts the number of horizontal lines of the image data for which writing to the DDR memory 64 is completed. The writing controlling unit 72 controls writing of image data to the DDR memory 64. The line notifying unit 73 notifies the DDR memory 64 of the number of the horizontal lines for which writing is completed. The written line counter 71, the writing controlling unit 72, the line notifying unit 73 may be implemented as hardware, or may be partly or entirely implemented as software.

Figure 6:
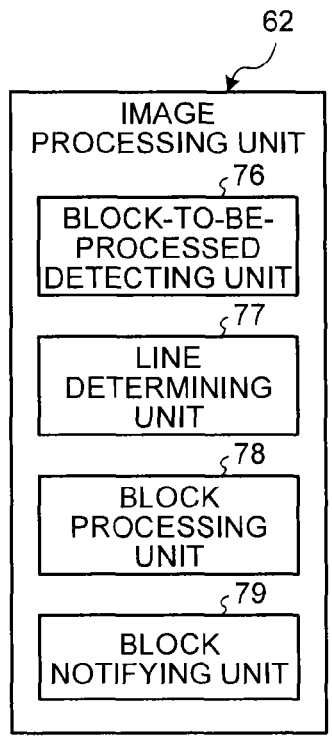
FIG. 6 is a functional block diagram of an image processing unit included in the video processing unit.

FIG. 6 is a functional block diagram of the image processing unit 62. The image processing unit 62 includes, as illustrated in FIG. 6, a block-to-be-processed detecting unit 76, a line determining unit 77, a block processing unit 78, and a block notifying unit 79. The block-to-be-processed detecting unit 76 detects a block to be subjected to the image correction, from a plurality of blocks into which the image data corresponding to one frame is divided. The line determining unit 77 determines if the writing of the horizontal lines corresponding to the entire image data allowing a block to be subjected to image correction to the DDR memory 64 has been completed. The block-to-be-processed detecting unit 76 and the line determining unit 77 are examples of a detecting unit.

The block processing unit 78 is an example of a correcting unit. The block processing unit 78 performs image correction such as distortion correction and perspective correction to the image data in units of one block, for example. The block notifying unit 79 notifies of the block number of the block subjected to the image correction. The block-to-be-processed detecting unit 76, the line determining unit 77, the block processing unit 78, the block notifying unit 79 may be implemented as hardware, or may be partly or entirely implemented as software.

Figure 7:
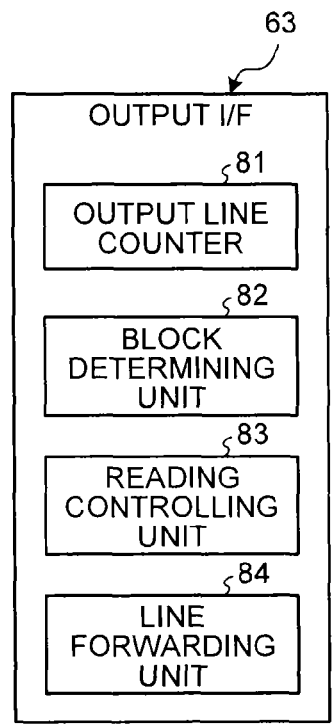
FIG. 7 is a functional block diagram of an output I/F included in the video processing unit.

FIG. 7 is a functional block diagram of the output I/F 63. The output I/F 63 includes, as illustrated in FIG. 7, an output line counter 81, a block determining unit 82, a reading controlling unit 83, and a line forwarding unit 84. The output line counter 81 counts the number of horizontal lines in the image data to be forwarded to the encoder. The block determining unit 82 determines if writing of the entire image data corresponding to the horizontal line to be forwarded to the encoder 16A has been completed, based on the block number notified from the block notifying unit 79 in the image processing unit 62.

The reading controlling unit 83 reads the horizontal line for which writing of the entire image data has been completed from the DDR memory 64. The line forwarding unit 84 is an example of a transmitting unit. The line forwarding unit 84 forwards the image data of the horizontal line read from the DDR memory 64 by the reading controlling unit 83 to the encoder 16A. The output line counter 81, the block determining unit 82, the reading controlling unit 83, and the line forwarding unit 84 may be implemented as hardware, or may be partly or entirely implemented as software.

A piece of metadata is registered for each of the blocks in advance in the DDR memory 64. In other words, let us assume here that, as an example, the image data of one frame is divided virtually into 80 blocks consisting of 10 blocks arranged horizontally×8 blocks arranged vertically. One horizontal row consisting of 10 blocks is referred to as a block line. The size of distortion occurring in a piece of image data corresponding to one frame can be known based on the distortion factor of the camera lens of the camera unit 10A. The position where each of the blocks is displayed in one frame can be known based on the size of the distortion occurring in the image data of one frame. The horizontal line number indicating where the writing of the entire image data corresponding to each block is completed can be known based on the position where the corresponding block is displayed. The order in which the blocks in the entire data making up one horizontal block line are written can be known based on the horizontal line number indicating where the writing of the entire image data corresponding to each block is completed.

Therefore, metadata such as "the horizontal line number indicating where the writing of the entire image data for the corresponding block is completed", "the turn in which the corresponding block is to be processed in the horizontal block line", "the coordinates and the size of the area of the reference image (that is the input image to be subjected to the image correction)", and "the coordinate data that is unique for each pixel" is registered for each of the blocks in advance in the DDR memory 64.

The metadata representing "the horizontal line number indicating where the writing of the entire image data for the corresponding block is completed" is a piece of metadata that is dependent on the distortion of the image (e.g., calculated from the lens characteristics), and is a piece of metadata giving the DDR memory 64 information about the timing at which the image correction can be started with reference to the line number where the writing of the image data is completed.

Figure 8A:
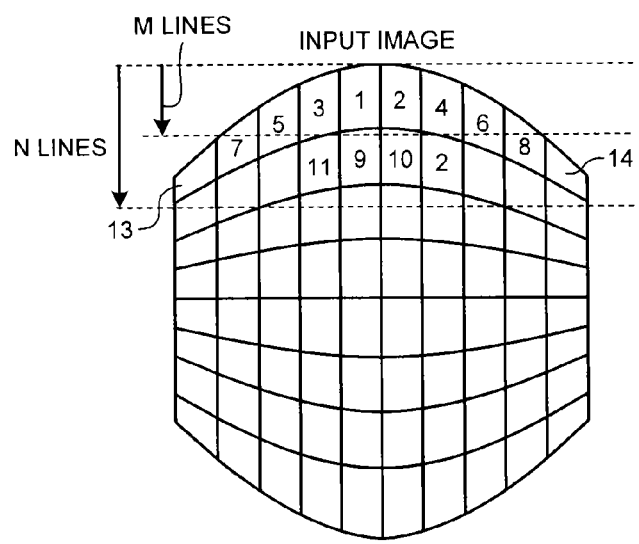
FIGS. 8A and 8B are schematics for explaining image correction according to the embodiment.
Figure 8B:
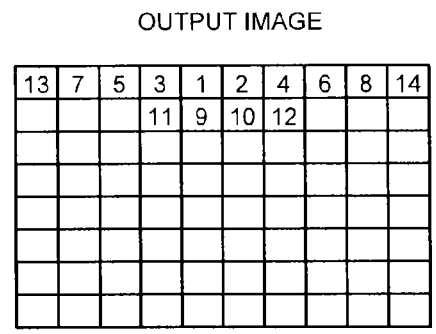

FIG. 8A is a schematic of the input image from the camera unit 10A. When a subject is captured with a wide-angle lens or a fisheye lens, for example, a distortion such as that in this input image occurs in the resultant input image. FIG. 8B is a schematic of the output image after the distortion is corrected with the image correction. The number assigned to each of the blocks in FIGS. 8A and 8B represents the order in which the blocks are subjected to the image correction, the order being determined based on the metadata described above. In the exemplary image correction illustrated in FIGS. 8A and 8B, the distortion is reduced by reducing the size at the center of the input image of FIG. 8A, and the input image of FIG. 8A is corrected into the output image of FIG. 8B. The image correction may also be performed into the output image in which the distortion is reduced by enlarging the size at the periphery of the input image of FIG. 8A.

In the example illustrated in FIG. 8A, due to the distortion occurring in the input image, the writing of image data of the fifth block from the left and the fifth block from the right in the topmost block line is completed at the timing at which the writing of the image data corresponding to the M horizontal lines to the DDR memory 64 is completed. Therefore, the metadata indicating the first to be subjected to the image correction is assigned to the fifth block from the left in the topmost block line, and metadata indicating the second to be subjected to the image correction is assigned to the fifth block from the right in the topmost block line, as the order in which the blocks are subjected to the image correction.

When the writing of the image data corresponding to the N horizontal lines (N>M) to the DDR memory 64 is completed, writing of the entire image data corresponding to all of the blocks in the topmost block line is completed. However, because writing of the image data of the fifth block from the left and the fifth block from the right in the second block line is completed before the writing of the entire image data corresponding to all of the blocks in the topmost block line is completed, the fifth block from the left and the fifth block from the right in the second block line are subjected to the image correction at earlier timing than those at the both ends of the topmost block line. Therefore, the metadata indicating the ninth to be subjected to the image correction is assigned to the fifth block from the left in the second block line, and the metadata indicating the tenth to be subjected to the image correction is assigned to the fifth block from the right in the second block line. The block at the left end of the topmost block line is assigned with the metadata of the thirteenth to be subjected to the image correction, and the block at the right end of the topmost block line is assigned with the metadata of the fourteenth to be subjected to the image correction.

While the number "N" indicating the number of horizontal lines required for writing of the entire image data corresponding to all of the blocks in one block line to be completed is dependent on the distortion factor of the camera lens in the camera unit 10A, the number "M" indicating the number of horizontal lines required for writing of the image data of one block with the block number "1" to be completely is less affected by the distortion factor of the camera lens. Therefore, the time of an image correction delay represented by the number "M" is relatively stable.

Furthermore, explained above is an example in which corrected is the distortion of the camera lens of the camera unit 10A. To correct such a distortion, the image correction is started from the block at the center of the topmost block line. By contrast, when performed is a perspective correction applied to a "falling-over-backwards" effect resulting from capturing an image of a subject from a position looking upwardly, e.g., resulting from capturing an image of participants of a teleconference from the camera unit 10A placed on a table, for example, the image correction is applied from the block at the right end in the topmost block line. In this manner, the order of blocks to be subjected to the image correction is changed as appropriate, depending on the characteristics of distortion.

Figure 9:
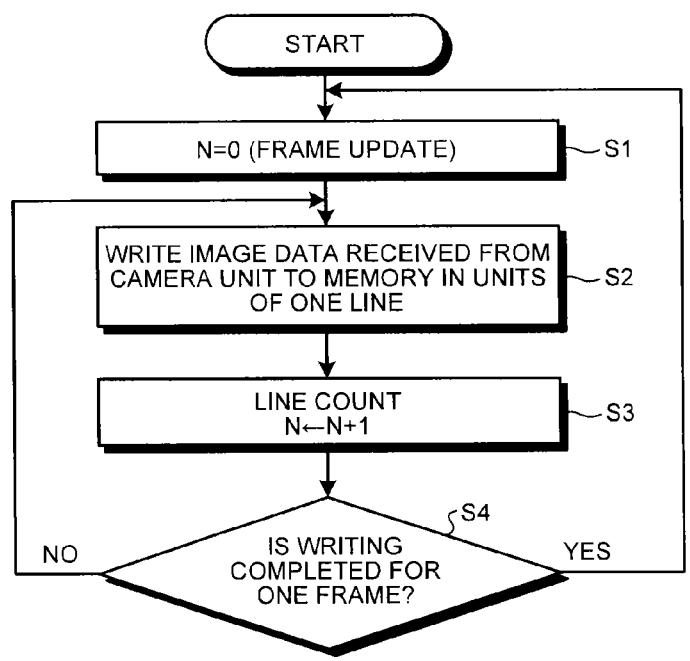
FIG. 9 is a flowchart for explaining an operation of the input I/F.

An image correcting operation performed by the video processing unit 50A will now be explained with reference to the flowcharts illustrated in FIGS. 9 to 11. FIG. 9 is a flowchart illustrating an operation of the input I/F 61 illustrated in FIGS. 4 and 7. In the comparative example explained with reference to FIGS. 2 and 3, the image correction is performed sequentially from the block at the upper left corner. The video processing unit 50A in the teleconference system according to the embodiment, however, performs the image correction from a block for which writing of the corresponding image data (reference image=image to be corrected) is completed.

At Step S1 in the flowchart illustrated in FIG. 9, the written line counter 71 in the input I/F 61 initializes the count of the number of lines for which writing to the DDR memory 64 is completed, to prepare for receiving the input image of a new frame from the camera unit 10A. The process then goes to Step S2.

At Step S2, the writing controlling unit 72 controls to write the input image data of a new frame received from the camera unit 10A to the DDR memory 64, in units of one horizontal line. At Step S3, the written line counter 71 counts the number of horizontal lines for which writing to the DDR memory 64 is completed. This allows this count of writing-completed lines to be incremented by "one" every time writing of the image data corresponding to one horizontal line to the DDR memory 64 is completed. The line notifying unit 73 notifies the image processing unit 62 of the count of the lines for which the writing is completed.

At Step S4, the writing controlling unit 72 determines if the writing of the image data corresponding to one frame to the DDR memory 64 is completed, by referring to the count of the lines for which the writing is completed. If the writing controlling unit 72 determines that the image data corresponding to one frame is not completed yet (No at Step S4), the process is returned to Step S2. The process at Steps S2 to S4 is repeated until the writing of the image data corresponding to one frame is completed.

If the writing controlling unit 72 determines that the writing of the image data corresponding to one frame is completed (Yes at Step S4), the process is returned to Step S1. The count of the number of lines for which writing to the DDR memory 64 is completed is then initialized, to prepare for receiving the input image of a new frame, and the processes at Steps S1 to S4 are repeated.

Figure 10:
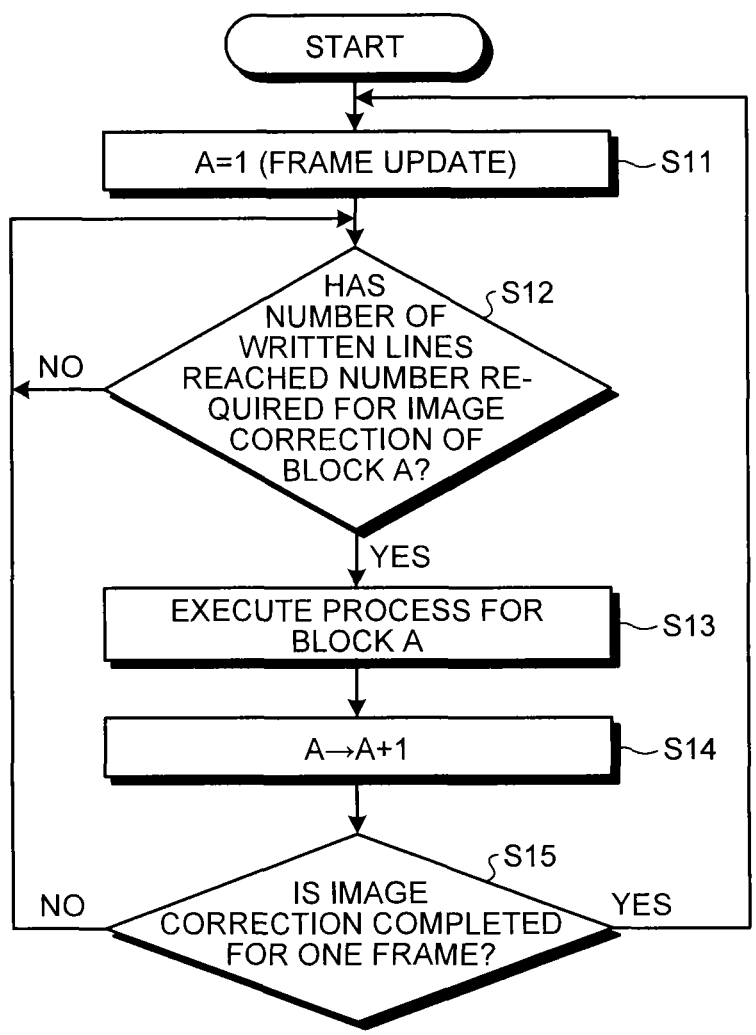
FIG. 10 is a flowchart for explaining an operation of the image processing unit.

FIG. 10 is a flowchart illustrating an operation of the image processing unit 62 illustrated in FIGS. 4 and 6. At Step S11 in the flowchart illustrated in FIG. 10, before starting the image correction of a new frame, the block-to-be-processed detecting unit 76 initializes the block number indicating a block for which the image correction has been completed (A=1). The process is then shifted to Step S12.

At Step S12, the line determining unit 77 determines if the image data corresponding to the number of horizontal lines allowing the image correction of the first block to be started has been written to the DDR memory 64. As explained with reference to FIG. 8A, the metadata indicating information such as the turn in which the block is subjected to the image, and the number of horizontal lines allowing the image correction to be started is stored for each of the blocks in advance in the DDR memory 64. The line determining unit 77 detects the metadata of the first block to be subjected to the image correction, from the metadata of all of the blocks in the DDR memory 64. The line determining unit 77 also detects the number of horizontal lines allowing the image correction to be started, from the detected metadata.

The line determining unit 77 then compares the number of horizontal lines allowing the image correction to be started detected from the metadata with the writing-completed line count notified from the line notifying unit 73 in the input I/F 61. While the line determining unit 77 does not determine that the notified writing-completed line count has reached the number of horizontal lines allowing the image correction to be started (No at Step S12), the block processing unit 78 keeps the image correcting process idle.

Step S13 is a process performed by the block processing unit 78 when the line determining unit 77 determines that the notified writing-completed line count has reached the number of horizontal lines allowing the image correction to be started (Yes at Step S12). At Step S13, the block processing unit 78 executes the image correction of the first block.

When the image correction of the first block is completed, the block-to-be-processed detecting unit 76 increments the block number indicating the block having been subjected to the image correction (=A) by "one" (A+1). Further, the block notifying unit 79 notifies the output I/F 63 of the block number of the block having been subjected to the image correction.

At Step S15, the block-to-be-processed detecting unit 76 determines if the image correction for all of the blocks in one frame has been completed, by referring to the block number of the block having been subjected to the image correction. If the image correction for all of the blocks in one frame is not completed yet (No at Step S15), the process is returned to Step S12, and the image correction of the second block is executed after waiting until the image data corresponding to the number of horizontal lines allowing the image correction of the second block to be started is written to the DDR memory 64. In this manner, the image correction is performed to the blocks in the ascending order of the block number (1→2→3→4→5 . . . ) assigned in the order from the block for which writing of the corresponding image data is completed earlier, as illustrated in FIG. 8A.

In this manner, the image correction is sequentially applied to each of the blocks, and if the image correction for all of the blocks in one frame is completed (Yes at Step S15), the process is returned to Step S11, and the image correction is applied to the input image of a new frame supplied from the camera unit 10A.

In the image correction according to the comparative example, writing of all of the blocks in one block line is completed at the timing at which scanning of the N horizontal lines is completed (see the N lines in FIGS. 8A and 8B). With the image correction according to the comparative example, therefore, the image correction cannot be started until the scans for the N horizontal lines are completed.

By contrast, the image processing unit 62 in the teleconference system according to the embodiment performs the image correction in the order from the block for which writing of the corresponding image data to the DDR memory 64 is completed, as illustrated in FIG. 8A. The image correction can therefore be started at the timing at which scanning of M horizontal lines (M<N) is completed, the timing being when the writing of the image data corresponding to the first block is completed, as illustrated in FIG. 8A.

Figure 12:
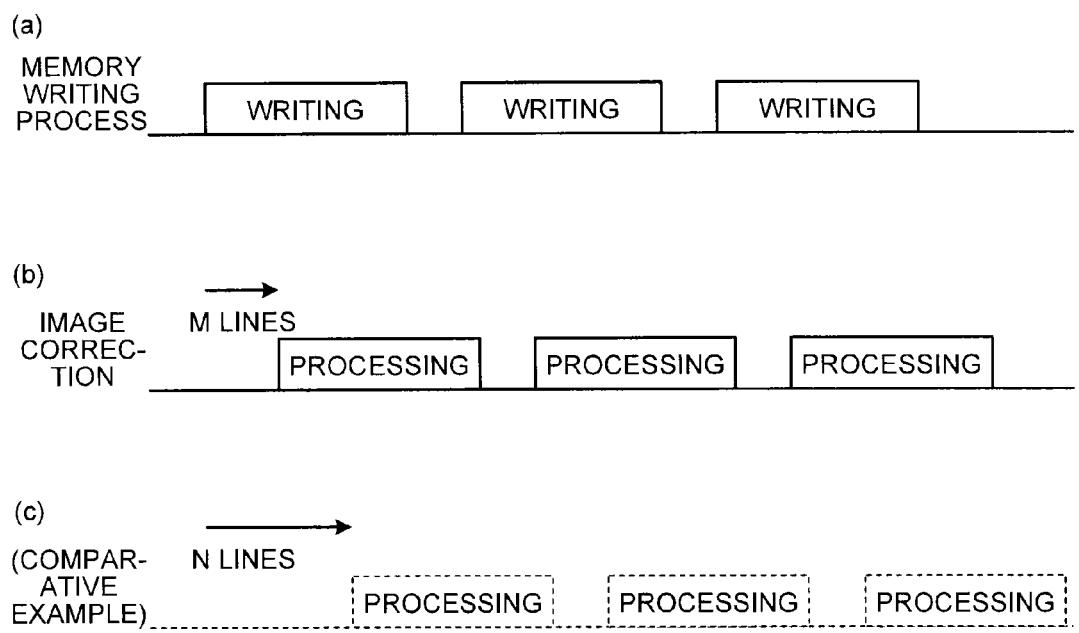
FIG. 12 is a schematic illustrating how a delay is reduced by the image correction according to the embodiment.

FIG. 12 illustrates the timing at which the writing to the DDR memory 64 is executed and the timing at which the image correction is started. FIG. 12 illustrates the timing at which the writing to the DDR memory 64 is executed at a part denoted by a symbol (a). FIG. 12 illustrates the timing at which the image processing unit 62 in the teleconference system according to the embodiment performs the image correction at a part denoted by a symbol (b). FIG. 12 illustrates the timing at which the image correction according to the comparative example is executed at a part denoted by a symbol (c). As can be seen from the comparison among the parts denoted by the symbols (a) to (c) in FIG. 12, the image correction can be started with a shorter waiting time (corresponding to the M horizontal lines).

Figure 11:
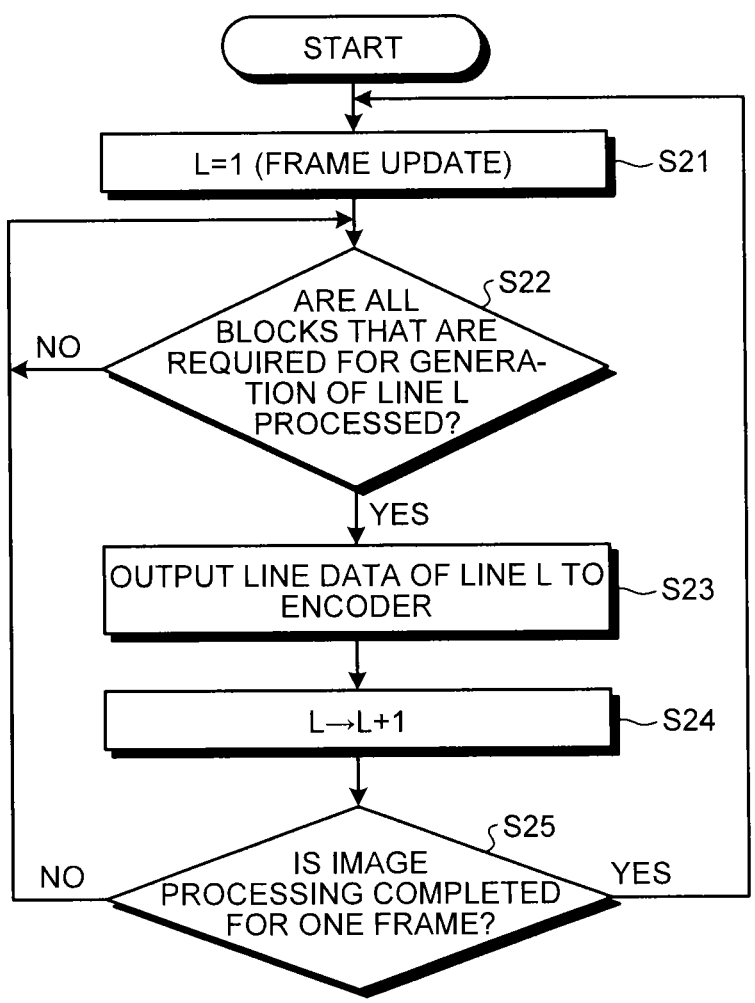
FIG. 11 is a flowchart for explaining an operation of the output I/F.

FIG. 11 is a flowchart illustrating an operation of forwarding the image data performed by the output I/F 63. At Step S21 in the flowchart illustrated in FIG. 11, to prepare for the transmission of a new frame, the output line counter 81, which is responsible for counting the number of horizontal lines of the image data to be forwarded to the encoder 16A, initializes the count (L=1). The process is then shifted to Step S22.

At Step S22, the block determining unit 82 determines if the image correction has been applied to the entire image data corresponding to the horizontal line to be forwarded. In other words, the block notifying unit 79 in the image processing unit 62 notifies the output I/F 63 of the block number of the block having been subjected to the image correction. The block determining unit 82 then determines if the image correction has been applied to the entire image data corresponding to the horizontal line to be forwarded by determining if the image data of the horizontal line to be forwarded is included in the block with the notified block number.

If the entire image data corresponding to the horizontal line to be forwarded has not been subjected to the image correction, the output I/F keeps the process idle until the block determining unit 82 determines that the entire image data corresponding to the horizontal line to be forwarded is subjected to the image correction. If the block determining unit 82 determines that the entire image data corresponding to the horizontal line to be forwarded has been subjected to the image correction, the process is shifted to Step S23.

At Step S23, the reading controlling unit 83 reads the image data of the horizontal line to be forwarded, from the DDR memory 64. The line forwarding unit 84 then forwards the read image data of the horizontal line to the encoder 16A. The process is then shifted to Step S24.

At Step S24, once the image data corresponding to one horizontal line is forwarded, the output line counter 81 increments the count of the horizontal lines by "one" (L+1) to prepare for the transmission of the next new frame. The process is then shifted to Step S25.

At Step S25, the line forwarding unit 84 determines if the image data corresponding to all of the horizontal lines in one frame have been transmitted, by referring to the count of the output line counter 81. If the line forwarding unit 84 determines that the image data corresponding to all of the horizontal lines in one frame has not been transmitted yet, the process is returned to Step S22, and the processes at Steps S22 to S25 are repeated.

If the line forwarding unit 84 determines that the image data corresponding to all of the horizontal lines in one frame has been transmitted, the process is returned to Step S21. The output line counter 81 then initializes the count again to prepare for the transmission of a new frame, and the processes at Steps S22 to S25 are repeated. FIG. 8B is a schematic of exemplary image data (output image) forwarded to the encoder 16A. The image data to be forwarded is subjected to image processing such as distortion correction as illustrated in FIG. 8B, and forwarded to the encoder 16A. The encoder 16A then performs a predetermined encoding process to the image data as well as to the sound data, and the image data is transferred to the second location system 2 sequentially via the network 4 and the server device 3.

When a piece of image data is transferred from the second location system 2 to the first location system 1, the image data is transferred following the same operation. For the operation of transferring the image data from the second location system 2 to the first location system 1, see the description of the operation of the first location system 1 above.

In the teleconference system according to the embodiment, the time for waiting for the image correction can be reduced to the M lines (see FIGS. 8 and 12), as described above. The delay in the image data transmission can therefore be reduced.

As should be clear from the description above, the teleconference system according to the embodiment divides a piece of input image from the camera unit 10A into a plurality of blocks. The image correction is then executed in the order from a block for which writing of the corresponding image data to the DDR memory 64 is completed, depending on the distortion occurring in the input image. In this manner, the image correction can be started at the timing at which the writing of the image data corresponding to a block to the DDR memory 64 is completed, even when the input image is distorted.

Therefore, without waiting for the writing of image data to the DDR memory 64 to be completed for all of the blocks in one block line, the image correction can be applied sequentially from the block for which writing of the corresponding image data has been completed. Therefore, the waiting time for the image correction can be reduced, and the delay in the transmission of the image data (and sound data) subjected to the image correction and encoding can be reduced.

The sequence of generating output image can be optimized by applying, for example, the image correction to the central portion of a piece of input image that is less distorted, when the image is captured with a wide-angle lens or a fisheye lens. In other words, the order of blocks to be subjected to the image correction can be optimized depending on how the input image is distorted. In this manner, the image correction can be started at an earlier timing, and the delay in transferring the image to a partner station can be reduced.

Each of the devices (e.g., server device, terminal device) according to the embodiment has a hardware configuration including a controller such as a central processing unit (CPU), storage devices such as a read-only memory (ROM) and a random access memory (RAM), an external storage device such as a hard disk drive (HDD) or a compact disc (CD) drive, a display device such as a display, and an input device such as a keyboard or a mouse.

The computer program executed by the apparatus according to the embodiment is stored in a computer-readable recording medium such as a compact disc read-only memory (CD-ROM), a flexible disk (FD), a compact disk-recordable (CD-R), or a digital versatile disk (DVD), as a file in an installable or executable format, and provided as a computer program product.

The computer program executed by the apparatus according to the embodiment may also be provided in a manner stored in a computer connected to a network such as the Internet and made available for download over the network. The computer program executed by the apparatus according to the embodiment may also be provided or distributed over a network such as the Internet.

The computer program according to the embodiment may be embedded in a ROM or the like in advance and provided.

The computer program executed by the apparatus according to the embodiment has a modular structure including the units described above. In the actual hardware, by causing the CPU (processor) to read the computer program from the storage medium and to execute the computer program, these units are loaded onto and generated on the main memory.

According to an embodiment, a delay in the image data transmission can be reduced advantageously.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
processing circuitry configured to
write image information of an input image to a memory;
detect one of a plurality of blocks into which the input image is divided, the one block being a block for which writing of corresponding image information to the memory is completed; and
perform a process of correcting a distortion occurring in the input image, for each block in order in which the blocks are detected by the processing circuitry,
wherein the input image is divided into separate horizontal lines, and the plurality of blocks divide the input image within each horizontal line, and
the processing circuitry writes the image information of the input image sequentially to the memory on a block by block basis of a horizontal line, and the processing circuitry begins the process of correcting the distortion in the input image for a first block within the horizontal line before all of the blocks of the horizontal line are written to the memory.

2. The image processing apparatus according to claim 1, further comprising a metadata memory storing therein metadata indicating order of the blocks in which writing to the memory is completed depending on the distortion occurring in the input image, wherein
the processing circuitry detects if the writing of the image information to the memory is completed in the order of the blocks indicated by the metadata.

3. A communication system comprising:
a plurality of terminal devices, each of the terminal devices including:
processing circuitry configured to
write image information of an input image to a memory;
detect one of a plurality of blocks into which the input image is divided, the one block being a block for which writing of corresponding image information to the memory is completed;
perform a process of correcting a distortion occurring in the input image, for each block in order in which the blocks are detected by the processing circuitry; and
transmit the image information subjected to the process of correcting over a certain network, wherein
the terminal devices exchange the image information over the network,
wherein the input image is divided into separate horizontal lines, and the plurality of blocks divide the input image within each horizontal line, and
the processing circuitry writes the image information of the input image sequentially to the memory on a block by block basis of a horizontal line, and the processing circuitry begins the process of correcting the distortion in the input image for a first block within the horizontal line before all of the blocks of the horizontal line are written to the memory.

4. The communication system according to claim 3, wherein each of the terminal devices further includes a metadata memory storing therein metadata indicating order of the blocks in which writing to the memory is completed depending on the distortion occurring in the input image, and the processing circuitry detects whether the writing of the image information to the memory is completed in the order of the blocks indicated by the metadata.

5. A non-transitory computer-readable medium containing an information processing program, the program causing an image processing apparatus to perform a method comprising:

writing image information of an input image to a memory;

detecting one of a plurality of blocks into which the input image is divided, the one block being a block for which writing of corresponding image information to the memory is completed; and performing a process of correcting a distortion occurring in the input image, for each block in order in which the blocks are detected, wherein the input image is divided into separate horizontal lines, and the plurality of blocks divide the input image within each horizontal line, and the method includes writing the image information of the input image sequentially to the memory on a block by block basis of a horizontal line, and beginning the process of correcting the distortion in the input image for a first block within the horizontal line before all of the blocks of the horizontal line are written to the memory.

6. The computer program product according to claim 5, wherein the method further including whether the writing of the image information to the memory is completed in order of the blocks indicated by metadata indicating order of the blocks in which writing to the memory is completed depending on the distortion occurring in the input image.

* * * * *